(12) United States Patent
Kell et al.

(10) Patent No.: US 8,983,507 B1
(45) Date of Patent: *Mar. 17, 2015

(54) PRIVATE PACKET NETWORK BACKBONE EXCHANGE WITH VARIABLE CALL TERMINATION LOCATION CAPABILITY

(75) Inventors: Scott D. Kell, Chicago, IL (US); Anthony J. Hiller, Chicago, IL (US); James E. Brewer, Chicago, IL (US)

(73) Assignee: Peerless Network, Inc., Chicago, IL (US)

( * ) Notice: Subject to any disclaimer, the term of this patent is extended or adjusted under 35 U.S.C. 154(b) by 144 days.

This patent is subject to a terminal disclaimer.

(21) Appl. No.: 13/453,637

(22) Filed: Apr. 23, 2012

(51) Int. Cl.
| | |
|---|---|
| H04W 4/00 | (2009.01) |
| H04M 9/00 | (2006.01) |
| H04M 11/04 | (2006.01) |
| H04M 3/42 | (2006.01) |
| H04W 40/00 | (2009.01) |
| H04W 24/00 | (2009.01) |
| H04M 1/00 | (2006.01) |
| H04L 12/28 | (2006.01) |
| H04L 12/26 | (2006.01) |
| H04L 12/413 | (2006.01) |

(52) U.S. Cl.
USPC ..... 455/461; 455/401; 455/404.2; 455/414.1; 455/414.2; 455/417; 455/445; 455/456.3; 455/551; 455/567; 455/456.1; 370/351; 370/352; 370/445

(58) Field of Classification Search
USPC ......... 370/351–388, 400–410, 420, 426, 259, 370/235, 445, 456.1; 379/220.01, 221.01, 379/221.13, 114.02, 114.14, 201.03, 379/213.01, 215.01, 265.03, 88.13, 88.21, 379/88.22; 455/417, 404.1, 414.1, 418, 455/426.1, 412.1, 412.2, 422.1, 437, 445, 4, 455/56.1, 456.3, 466, 401, 404.2, 414.2, 455/461, 551, 567; 705/325; 709/227, 206, 709/223

See application file for complete search history.

(56) References Cited

U.S. PATENT DOCUMENTS

| | | | |
|---|---|---|---|
| 5,610,977 A * | 3/1997 | Williams et al. | 379/221.13 |
| 5,764,745 A | 6/1998 | Chan et al. | |
| 5,915,009 A * | 6/1999 | Williams et al. | 379/229 |
| 6,047,055 A * | 4/2000 | Carkner et al. | 379/221.13 |
| 6,104,799 A * | 8/2000 | Jain et al. | 379/211.01 |
| 6,285,879 B1 * | 9/2001 | Lechner et al. | 455/432.3 |
| 6,327,358 B1 * | 12/2001 | March et al. | 379/221.01 |
| 6,373,817 B1 * | 4/2002 | Kung et al. | 370/217 |

(Continued)

OTHER PUBLICATIONS

Kell et al., U.S. Appl. No. 12/469,454, filed May 20, 2009.

*Primary Examiner* — Benjamin H Elliot, IV
*Assistant Examiner* — Eric Nowlin
(74) *Attorney, Agent, or Firm* — Marshall, Gerstein & Borun LLP; Randall G. Rueth (57) ABSTRACT

A private packet network backbone exchange (PPNBE) may include a capability for determining a variable call termination location corresponding to a called party. The PPNBE may directly query one or more data sources administered by a communications service provider other than the provider of the PPNBE to determine a current location to which an originating call is to be terminated, and the PPNBE may provide a "one-hop" call connection between the originating entity and the terminating entity of the call without traversing or communicating with any other exchanges. The PPNBE may re-direct established calls by directly querying the one or more data sources. Multiple data sources administered by one or more other communications service provider may be directly accessed by the PPNBE for call termination and/or re-direction purposes.

29 Claims, 4 Drawing Sheets

(56) References Cited

U.S. PATENT DOCUMENTS

| | | | |
|---|---|---|---|
| 6,751,307 B2 * | 6/2004 | McAlinden | 379/201.02 |
| 6,968,193 B2 * | 11/2005 | Van Loon et al. | 455/455 |
| 6,978,003 B1 * | 12/2005 | Sylvain | 379/211.02 |
| 6,999,463 B2 | 2/2006 | Christie et al. | |
| 7,096,023 B1 | 8/2006 | Eikkula | |
| 7,162,237 B1 * | 1/2007 | Silver et al. | 455/432.3 |
| 7,532,884 B2 * | 5/2009 | Silver et al. | 455/432.3 |
| 7,664,495 B1 * | 2/2010 | Bonner et al. | 455/433 |
| 7,715,413 B2 * | 5/2010 | Vaziri et al. | 370/401 |
| 8,102,988 B2 | 1/2012 | Gavillet et al. | |
| 8,208,413 B1 * | 6/2012 | Bienn et al. | 370/271 |
| 8,611,519 B2 * | 12/2013 | Shah et al. | 379/201.02 |
| 8,761,363 B2 * | 6/2014 | Rajagopalan et al. | 379/142.07 |
| 2004/0022237 A1 * | 2/2004 | Elliott et al. | 370/356 |
| 2004/0180654 A1 * | 9/2004 | Chen | 455/433 |
| 2006/0193461 A1 * | 8/2006 | Gavillet et al. | 379/221.13 |
| 2010/0105379 A1 * | 4/2010 | Bonner et al. | 455/433 |
| 2011/0110504 A1 * | 5/2011 | Kaal et al. | 379/93.02 |

* cited by examiner

PRIVATE PACKET NETWORK BACKBONE EXCHANGE WITH VARIABLE CALL TERMINATION LOCATION CAPABILITY

CROSS-REFERENCE TO RELATED APPLICATIONS

This application is related to U.S. application Ser. No. 12/469,454, entitled "System and Method of Providing Communication Service Using a Private Network Backbone," filed May 20, 2009, the disclosure of which is hereby expressly incorporated herein by reference.

TECHNICAL FIELD

The following disclosure relates to terminating calls to non-fixed locations and devices using a private packet network backbone exchange.

BACKGROUND

In today's telephony and communication networks, call completion may require traversal through multiple switches and/or network elements that are owned, operated or controlled by multiple service providers. When a call is to be terminated to a communications device whose location varies over time, typically the call must be routed to a home switch or exchange of a carrier or service provider corresponding to the communications device, and the home switch or exchange accesses a routing database to determine the current location of the communications device. For example, if the communications device is a mobile phone, the call is routed to a home switch of the mobile phone, the home switch accesses a Home Location Register/Visiting Location Register to determine a visiting switch to which the call should be delivered for termination. In another example, when a called subscriber or party has activated a "follow me" feature and has directed calls to be received at a selected Voice over Internet Protocol (VoIP) communications device, the call is routed to a VoIP gateway of a VoIP service provider and an E.164 Number Mapping (ENUM) database must be accessed to terminate the call to the selected VoIP communications device. In yet another example, an extra query to a Service Control Point (SCP), Intelligent Network node, or some other services provider node or exchange is required in order to obtain the current location of a called party for terminating a call.

These and other variable call termination location call scenarios may incur excessive costs as each company, owner, carrier or service provider controlling each of the network elements (e.g., mobile service provider home switch, VoIP service provider gateway, etc.) may charge for connecting with its particular network element. Carriers are required to negotiate multiple complex network connection and access agreements with multiple other providers, and may reflect or pass along resulting increased costs to their subscribers. Furthermore, the time to deliver a call to a variable location is increased, as the call must be routed to another exchange or node to determine a current location for call termination, or extra messaging to/from an additional node must be performed in order to determine the current location.

SUMMARY OF THE DISCLOSURE

Embodiments of a private packet network backbone exchange (PPNBE) with variable call termination location capability may include a logical call control entity, a single logical routing database coupled to the logical call control entity, a plurality of call content delivery connections to a plurality of exchanges, and a signaling connection to a signaling network. The signaling connection may be coupled to the logical call control entity, and the signaling network may be communicatively coupled to at least one exchange of the plurality of exchanges. The PPNBE may also include a private packet network and a communication link to a location data source administered by a provider other than a provider of the PPNBE.

The logical call control entity may be configured to receive an incoming call from a first exchange via a first call content delivery connection. The incoming call may indicate a called party, and a call termination location of the called party may vary over time. The logical call control entity may be further configured to cause a direct query of the location data source to determine a current location to which the incoming call is to be terminated. The logical call control entity may be further configured to establish, in conjunction with the single logical routing database, a one-hop communication session at the PPNBE to deliver a content of the incoming call between the first exchange and a second exchange over the private packet network without traversing any other exchanges. The second exchange may correspond to the current location at which the incoming call is to be terminated.

Embodiments of a method for providing communication service to variable call termination locations may include receiving, from a first exchange, a first call control signal corresponding to an incoming call at a logical call control entity of a private packet network backbone exchange (PPNBE). Information included in the incoming call may indicate that the location at which the incoming call is to be terminated may be variable. The method may include directly querying, by the logical call control entity, a location data source to determine a current location to which the incoming call is to be terminated. The location data source may be administered by a provider other than a provider of the PPNBE, and in an embodiment, the location data source may be administered by a communications service provider of the called party.

Additionally, the method may include determining a second exchange to which the incoming call is to be delivered. The logical call control entity may make the determination by using a single logical routing database of the PPNBE coupled to the logical call control entity, and based on the current location to which the incoming call is to be terminated. The method may further include providing, via a private packet network included in the PPNBE, a call path for delivery of a content of the incoming call between the first exchange and the second exchange without traversing any other exchanges; and causing a second call control signal corresponding to the incoming call to be transmitted from the logical call control entity to the second exchange. The first exchange, the second exchange, and/or the PPNBE may each be controlled by different communication service providers or carriers.

Embodiments of a call control entity for providing communication service to variable call termination locations may include a connection to a signaling network, a connection to a private packet network, and a connection to a location data source administered by a provider other than a provider of the call control entity. Additionally, the call control entity may include a computing device including a processor, a memory, and computer-executable instructions stored on the memory and executable by the processor.

The computer-executable instructions may be executable to receive, from a first exchange coupled to the private packet network, a first call control signal corresponding to an incoming call, where contents of the call indicate that a call termination location is not fixed. The instructions may be further executable to generate a query to directly access the location data source to determine a current location to which the incoming call is to be terminated, and to determine, based on the current location, a second exchange coupled to the private packet network and to which the incoming call is to be delivered. The instructions may be further executable to cause a logical call path to be established through the private packet network for delivery of a content of the incoming call between the first exchange and the second exchange, and to cause a second call control signal corresponding to the incoming call to be transmitted from the call control entity to the second exchange.

DETAILED DESCRIPTION

Figure 1:
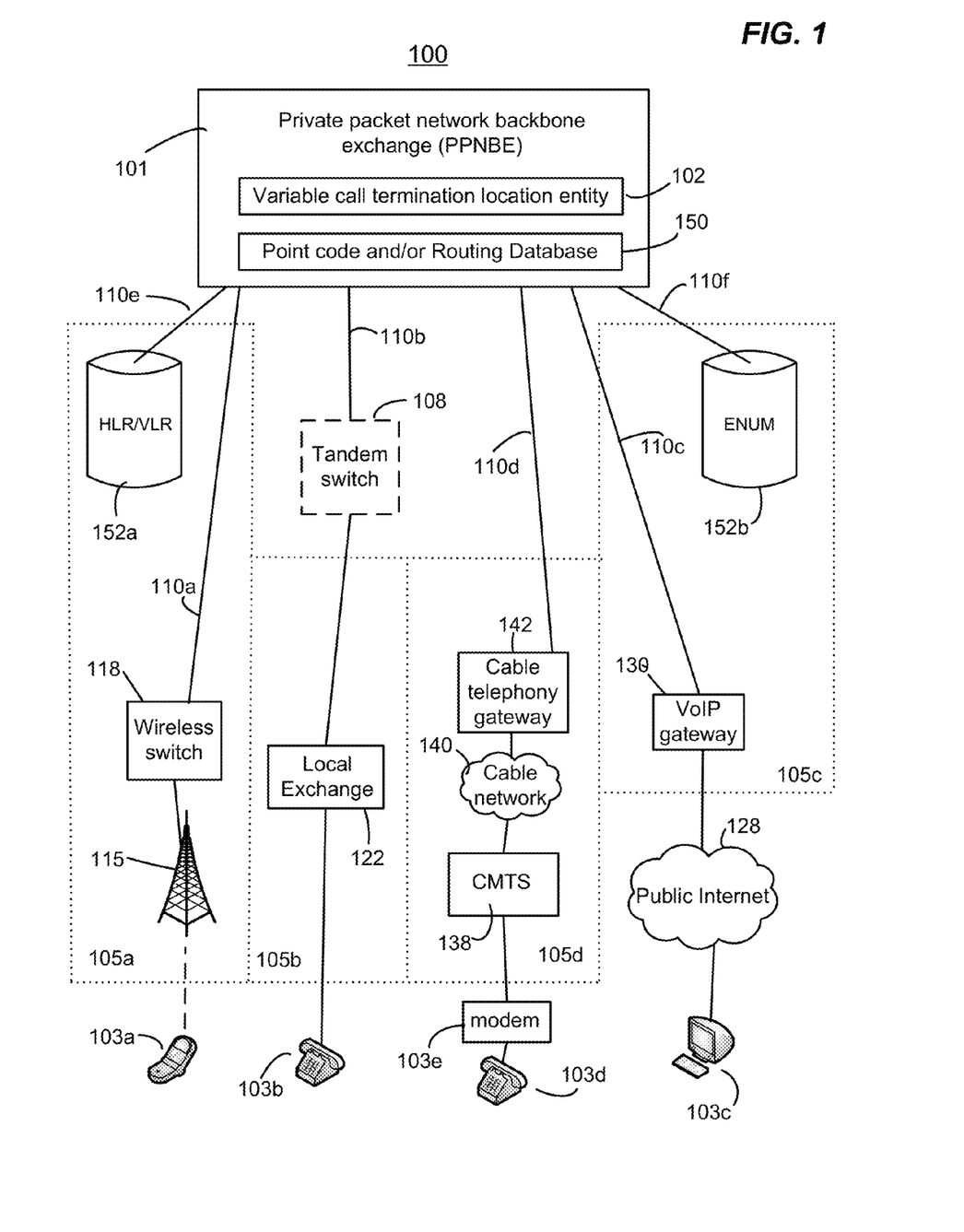
FIG. 1 is a diagram of an example of a communication network architecture including a private packet network backbone exchange (PPNBE) with variable call termination location capability.

FIG. 1 is a diagram of a communications network architecture 100 including a private packet network backbone exchange (PPNBE) 101 having an entity that provides variable call termination location 102. In an embodiment, the PPNBE 101 may be a private packet network backbone exchange such as that described in U.S. application Ser. No. 12/469,454 entitled "System and Method of Providing Communication Service Using a Private Network Backbone" and filed May 20, 2009, the entire disclosure of which is hereby expressly incorporated herein by reference.

The PPNBE 101 with variable call termination location capability 102 may include a single logical switch or exchange for providing "one-hop" routing between carriers and/or local service providers for local calls, long distance calls, and other types of calls. In particular, the PPNBE 101 with variable call termination location capability 102 may provide "one-hop" routing for calls that are to be terminated at locations that vary over time, e.g., to a mobile device whose location may change over time, to various different Customer Premises Equipments (CPEs) at various different times as indicated by a subscriber, to a particular physical location or particular CPE as indicated by a subscriber, etc.

The term "one-hop routing," as used herein, means that an originating call is routed from a local carrier at the calling end through only one logical exchange before terminating at a same or different local carrier at the called end. As used herein, a "call" is understood to be a communication connection between at least one originating party (e.g., a "calling party") and at least one terminating party (e.g., a "called party"). In this disclosure, a "call" may transmit voice, data, both, or other types of content for communication between parties. For instance, a call may be a voice call, a video, a fax, a multi-media transmission, a connection to a recorded message, a text message, a data stream, and the like. As also used herein, the terms "subscriber," "user," and "end-user" are used interchangeably and are understood to be a person or entity having an agreement for communication service (e.g., to originate and/or terminate calls) via a network of a carrier or local service provider.

Also herein, the terms "access technology," "subscriber access technology," and "local access technology" are used interchangeably to refer to any known technology by which an end-user or subscriber may connect from his or her CPE to access a communication service provider's network for communication service. Such access technologies may include physical connections, wireless connections of any frequency band, cable telephony connections, VoIP connections, Plain Old Telephone Service (POTS) connections, and other possible access technologies. For example, a CPE may use a dedicated IP connection, the public Internet or some combination of the two to access a VoIP service provider's network.

Referring to FIG. 1, the PPNBE 101 may be able to provide interconnectivity between multiple different subscriber technologies offered by multiple carriers and/or local service providers. Both non-voice and voice communication traffic may be able to be simultaneously supported by the PPNBE 101. Calls may originate with subscribers of any local service provider or carrier using any access technology, and may terminate at a subscriber of any type of local service provider or carrier using any access technology.

For example, in the communications network 100, customer premises equipment (CPE) of varying access technologies (references 103a, 103b, 103c, 103d, 103e) may interface with network elements controlled by respective local service providers or carriers (references 105a, 105b, 105c, 105d), and the network elements controlled by local service providers or carriers may connect to the PPNBE 101 (via connections 110a, 110b, 110c, 110d) for routing calls between exchanges. An originating call may be routed from the network element operated or controlled by its corresponding local service provider 105a-105d directly to the PPNBE 101, and then may be routed directly from the PPNBE 101 to the appropriate network element of the terminating-side local service provider (105a-105d). As such, the call may traverse from the originating exchange through the private packet network backbone exchange 101 to the terminating exchange without traversing any other exchanges, i.e., "one-hop."

In an illustrative but non-limiting call scenario, a subscriber may initiate a call from a wireless device 103a using any frequency band, smart phone, computer supported by WiFi™, WiMAX (Worldwide Interoperability for Microwave Access) or other wireless access technology, or similar device. The wireless device 103a may communicate with a cell site, antenna or wireless service access point 115 owned, operated and/or controlled by the wireless service provider 105a. The call may be routed by the wireless service provider 105a from the wireless service access point 115 to a corresponding wireless switch 118. From the wireless switch 118, the call may then be directly routed to the PPNBE 101 over the connection 110a without traversing any other exchanges. The PPNBE 101 may then directly route, based on information stored in a routing database 150 and without traversing any other exchanges, the call to an exchange capable of having a direct connection with a CPE at which the call is to be terminated, e.g., the exchange 122, 142 or 130, another wireless exchange of the same or different wireless carrier (not shown), or some other exchange in direct connection with the PPNBE 101 (also not shown).

In an example call scenario of an originating landline telephone call, a subscriber to a local telephone service provider 105b may initiate a call from a telephone, fax, or other such wired device 103b. Local telephone service provider 105b may be a LEC (Local Exchange Carrier), a Competitive Local Exchange Carrier (CLEC) or other type of local telephone service provider. Local telephone service provider 105b may own, operate, partially or totally lease, and/or control a local exchange switch 122 that receives the origination from CPE device 103b. The dialed digits in the origination may be analyzed by local exchange switch 122, and the call may be directly routed to the PPNBE 101 over the connection 110b without traversing any other exchanges. The PPNBE 101 may route, based on information stored in a routing database 150 and without traversing any other exchanges, the call to an exchange capable of having a direct connection with a CPE at which the call is to be terminated, e.g., the exchange 118, 142 or 130, an exchange of the same or another LEC (not shown), or some other exchange in direct connection with the PPNBE 101 (also not shown).

In an example call scenario of an originating VoIP call, a subscriber to a VoIP carrier 105c may initiate a call from a computer or other computing device 103c. The originating VoIP call may be set up via, for instance, VoIP software on device 103c and/or a server of VoIP carrier 105c using a wired or wireless (e.g., Wi-Fi) connection. The call may then be routed through the public Internet 128. The call may exit the public Internet 128 at a VoIP gateway 130, and the VoIP gateway 130 may directly route the call to the PPNBE 101 over a connection 110c without traversing any other exchanges. The PPNBE 101 may then route, based on information stored in a routing database 150 and without traversing any other exchanges, the call to an exchange capable of having a direct connection with a CPE at which the call is to be terminated, e.g., the exchange 118, 122, or 142, another VoIP gateway of the same or different carrier (not shown), or some other exchange in direct connection with the PPNBE 101 (also not shown).

In an example of a call originating in a cable telephony network 105d, a cable telephony subscriber may initiate a call from a device 103d such as a telephone or other device in communication with a modem 103e such as a cable modem or multimedia terminal adapter (MTA). Using typical cable telephony architecture, the call may be received at the head-end (usually by a cable modem termination system (CMTS) 138), routed through the cable telephony network 140, and exit the cable telephony system via a cable telephony gateway 142. The call may be directly routed to the PPNBE 101 over a connection 110d without traversing any other exchanges, and the PPNBE 101 may route, based on information stored in a routing database 150, the call to an exchange to which the call is to be terminated.

In some embodiments, an originating call from any carrier 105a-105d may be routed through a tandem switch 108. As a non-limiting example, referring to FIG. 1, an originating call from a local land-line CPE 103b may be routed through the tandem switch 108 and then to the PPNBE 101. Although not illustrated in FIG. 1, carriers 105a, 105c and 105d may each route calls through a tandem exchange 108 or a different tandem exchange to reach the PPNBE 101. Embodiments using a tandem switch 108 may be used, for example, if the carrier 105b is the owner, operator, lessee and/or controller of tandem switch 108, and/or if the carrier 105b desires to connect with the PPNBE 101 with minimal disruption to an embedded or legacy communications architecture.

One of ordinary skill in the art will understand that although only four types of local service providers or carriers (105a, 105b, 105c, 105d) are illustrated in FIG. 1, other types of local service providers supporting other types of local or subscriber access technologies and communication services are also possible. For instance, communication calls may be originated using DSL or other types of modems, different radio frequency bands and access technologies, and the like. In some embodiments, a local service provider may be a private branch exchange or system, such as used for a college, governmental or corporate entity. In some embodiments, although not illustrated in FIG. 1, the communications network 100 may additionally or alternatively include one or more inter-exchange carriers (IXCs), Regional Bell Operating Company (RBOC) tandem exchanges, international gateway exchanges, or other exchanges, each in connection with the PPNBE 101.

The switches and/or network entities of the communications network 100 illustrated in FIG. 1 (e.g., references 101, 108, 118, 122, 130, 142, and others not shown) may be connected to a signaling network, such as a Signaling System 7 (SS7) network. Accordingly, each of the switches and/or network entities may have a unique point code, identification or address with which to identify itself to the other network elements. Each of the switches and/or network entities (e.g., references 101, 108, 118, 122, 130, 142, and others not shown) may have a corresponding routing database to manage, administer, and to use in routing calls. For example, the PPNBE 101 may route calls in conjunction with a single logical routing database 150, and the PPNBE 101 may be identified by information in the single logical routing database 150. In an embodiment, the PPNBE 101 may be identified by a single logical point code. In another embodiment, multiple point codes may be assigned to the PPNBE 101 to support increased capacity, however, all point codes for the PPNBE 101 may be included in the single logical routing database 150.

The switches and or network elements of FIG. 1 (e.g., references 101, 108, 118, 122, 130, 142, and others not shown) may each be controlled, owned and/or operated by a different company or organization, such as a communications carrier or service provider. In some arrangements, one company may own, operate and/or control more than one network element (e.g., references 108, 118, 122, 130, 142, and others not shown). Typically, however, the provider or carrier of the PPNBE 101 is different from any of the other providers or carriers 105a-105d of other network entities (e.g., exchanges 108, 118, 122, 130, 142) of the communications network 100.

With regard to variable call termination location, in some call scenarios, an originating call may indicate a CPE of a called party whose physical location may vary over time. For example, the called party may be a subscriber of the wireless carrier 105a, and as such, the subscriber may desire calls to be terminated to a particular mobile device. In some call scenarios, an originating call may indicate a called party who may choose one of a set of CPEs or locations at which he or she desires calls to be terminated at different times. For example, a called party may be a subscriber of a "follow-me" feature (e.g., as provided by the VoIP carrier 105c or by a land-line carrier 102b), where the called party may select a particular device or a location (e.g., home phone, home computer, office extension, office computer, laptop, mobile device, other land-line phone, etc.) to which he or she desires calls to be terminated at a certain time or during a certain time interval. The PPNBE 101 may support these and other variable call termination location scenarios by using the variable call termination location entity 102 included within the PPNBE 101.

In particular, when the PPNBE 101 receives an incoming call, the PPNBE 101 may determine that the incoming or originating call is to be terminated to a subscriber whose call termination location may vary over time. For example, the PPNBE 101 may assess contents of the signaling corresponding to the incoming call (e.g., an identification of the called party, an indication of the carrier or service provider of the called party, an indication of a destination, etc.), and from the contents, the PPNBE 101 may determine that the incoming or originating call is to be terminated to a called party whose location may vary over time. The variable call termination location entity 102 of the PPNBE 101 may determine a current location a CPE of the called party by directly accessing (e.g., by query, read, dip, etc.) a data source or database 152a, 152b that stores indications of current call termination locations of subscribers.

For example, if the called party is a subscriber of wireless communication service provider 105a, the variable call termination location entity 102 may directly access 110e a Home Location Register/Visiting Location Register (HLR/VLR) 152a of the wireless carrier 105a to determine a current location of the called party's mobile device. The HLR/VLR 152a may not be administered, owned, operated or maintained by the provider of the PPNBE 101. Rather, the provider or carrier of the PPNBE 101 and the wireless carrier 105a may have an agreement (business, technical, and/or otherwise) so that the PPNBE 101 may directly access the HLR/VLR 152a of the wireless carrier 105a. Accordingly, the PPNBE 101 may directly access, query or read 110e the HLR/VLR 152a of the wireless carrier 105a to obtain the current location of the called party's mobile device. For example, the PPNBE 101 may access the HLR/VLR 152a by transmitting, over a communications link, a message, query or command that is compatible with a protocol understood by the HLR/VLR 152a, e.g., Telecommunications Industry Association Interim Standard 41 (IS-41), Global System for Mobile Communications (GSM) Mobile Application Part (MAP), or other HLR/VLR access standard, protocol or convention, and the HLR/VLR 152a may directly respond in kind with the requested current location. Based on the current location, the PPNBE 101 may route, in a "one-hop" manner, the call to an appropriate exchange corresponding to the current location of the called party, e.g., to a roaming switch or a traveling switch.

In another example, if the called party is a subscriber of a "follow-me" feature provided by a VoIP service provider 105c, the variable call termination location capability 102 of the PPNBE 101 may directly access an E.164 Number Mapping (ENUM) data source or database of the VoIP carrier 105c to determine a current location at which the called party desires to receive calls. The ENUM database 152b may not be administered, owned, operated or maintained by the provider of the PPNBE 101. Rather, the provider or carrier of the PPNBE 101 and the VoIP carrier 105c may have an agreement (business, technical, and/or otherwise) so that the PPNBE 101 may directly access 110f the ENUM database 152b of the VoIP carrier 105c. Accordingly, the PPNBE 101 may directly access or read the ENUM database 152b of the VoIP carrier 105c to obtain the current desired call termination location of the called party. For example, the PPNBE 101 may access the ENUM data source or database 152b using a message, query or command that is understood by the ENUM database 152b, e.g., that is compatible with the E.164 Number Mapping (ENUM) standard. Based on the determined current location, the PPNBE 101 may route the call, in a "one-hop" manner, to an appropriate exchange capable of forming a local connection with a device or address that the called party has indicated as a current desired call termination location.

Of course, the variable call termination location capability 102 of the PPNBE 101 is not limited to only determining variable call termination locations of subscribers of wireless carriers 105a and of subscribers of VoIP carriers 105c. The variable call termination location capability 102 of the PPNBE 101 may determine variable locations of subscribers of any communications carrier. The variable call termination location capability 102 of the PPNBE 101 may determine variable locations of multiple subscribers of multiple communications carriers or service providers. Calls to subscribers may be terminated in a "one-hop" manner by the PPNBE 101 to various different physical locations and/or devices over time.

In some embodiments, the PPNBE 101 may obtain information corresponding to variable call termination locations of subscribers of one or more communications carriers from one or more data sources. The PPNBE 101 may store the information locally at the PPNBE 101, and may synchronize the locally stored call termination location information with the one or more data sources. For example, the PPNBE 101 may query (independently of routing any particular call) one or more data sources of the one or more communications carriers to obtain current location information. Alternatively or additionally, one or more communications carriers may update the locally stored information at the PPNBE 101 (e.g., by "pushing" updates) independently of routing any particular call. In these embodiments, the variable call termination location capability 102 of the PPNBE 101 may determine variable locations of subscribers (of any communications carrier or of multiple communications carriers) using a function call, command, local database access query, or similar.

Figure 2:
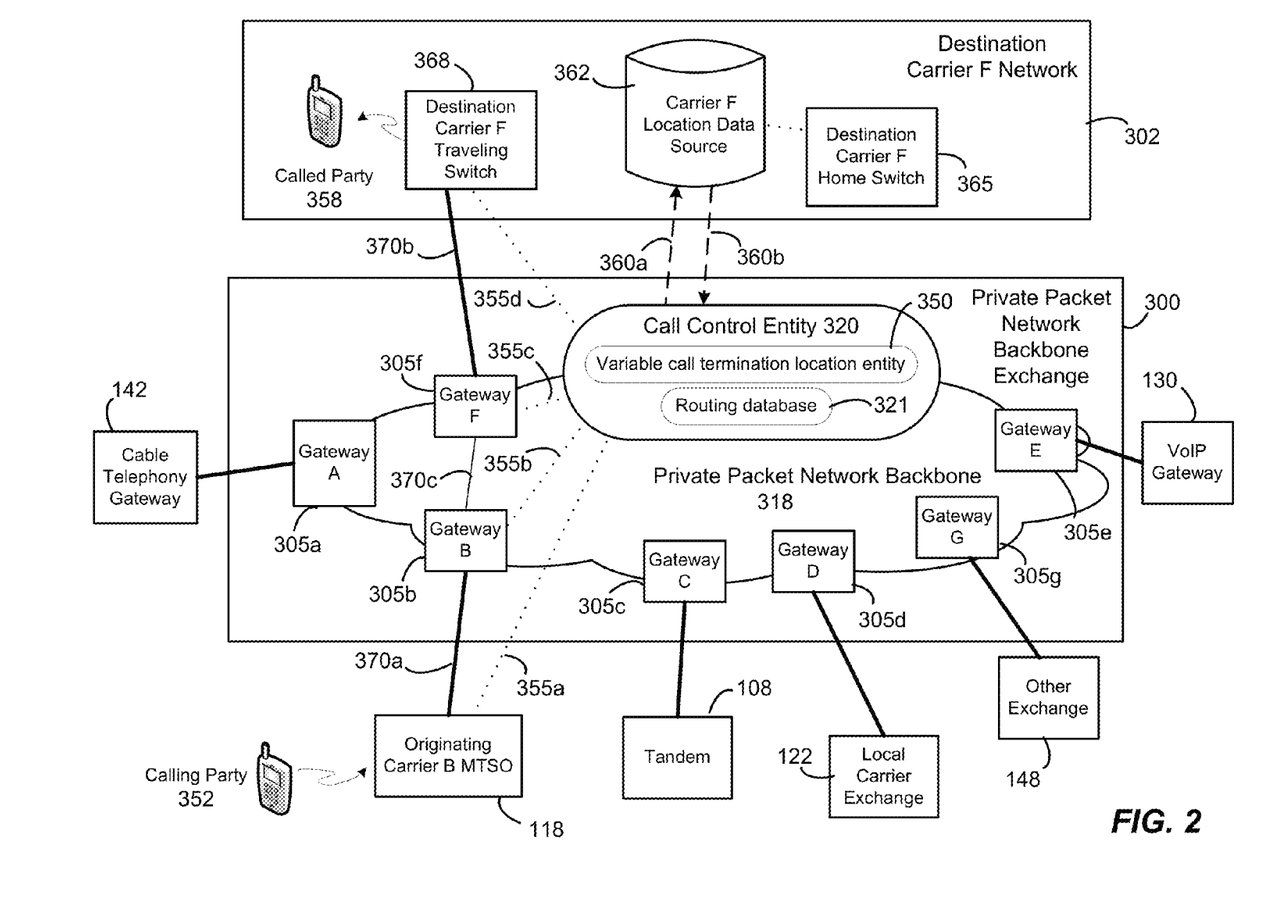
FIG. 2 illustrates an embodiment of a private packet network backbone exchange with variable call termination location capability.

FIG. 2 illustrates an embodiment of a private packet network backbone exchange (PPNBE) 300, such as the PPNBE 101 of FIG. 1. An incoming call may access the private packet network backbone exchange 300 via one of the PPNBE gateways A-G, respectively denoted in FIG. 2 by reference numbers 305a-305g. As used herein, the term "PPNBE gateway" is not limited to mean a gateway of any particular technology, but generally refers to one or more gateways 305a-305g that serve as a gateway between one or more types of communication technology of an external exchange (e.g., TDMA, VoIP, POTS, etc.) and the PPNBE 101. Incoming call traffic at the PPNBE 101 may traverse a private packet network backbone 318 to an appropriate terminating PPNBE gateway 305a-305g, and may be routed from the appropriate terminating PPNBE gateway 305a-305g to the corresponding external carrier entity exchange (108, 118, 122, 130, 142, 148) for delivery to a terminating CPE. It is important to note that PPNBE gateways 305a-305g do not serve the same function as local access gateways of other types of local access networks, such as VoIP or cable telephony gateways (e.g., references 130 and 142, respectively). Rather, PPNBE gateways 305a-305g may serve as interface points from the carrier or local service provider networks into the private packet network backbone 318 of the private packet network backbone exchange 300. The PPNBE gateways 305a-305g may each be operated, owned, and/or controlled by a PPNBE service provider, i.e., a service provider that operates, owns and/or controls the private packet network backbone exchange 300 itself.

Some carriers or service providers whose exchanges interface with the PPNBE 300 (e.g., service providers 105a-105d of FIG. 1) may have one or more local access gateways that they self-manage and control, such as VoIP gateway 130, cable telephony gateway 142, and the like. The local access gateways managed and controlled by other carriers or service providers may interface with the PPNBE gateways 305a-305g. For example, a VoIP service provider may connect to the PPNBE gateway E 305e via a VoIP gateway 130, a cable communications service provider may connect to the PPNBE gateway A 305a via a cable telephony gateway 142, and so on.

The local access gateways 130, 142 managed and controlled by other service providers, however, are not the same entities as the PPNBE gateways 305a-305g of the private packet network backbone exchange 300.

In some embodiments, the private packet network backbone 318 of the PPNBE 300 may include a set of privately managed nodes (not shown) to route packet call traffic. Each PPNBE gateway 305a-305g may convert incoming call traffic from the protocol or format used by the originating carrier entity (108, 118, 122, 130, 142, 148) into a packet format used by the set of privately managed nodes in the private packet network backbone 318. In some embodiments, the set of privately managed nodes may communicate and route packets using a packet format corresponding to an Internet Protocol format (IP). In these embodiments, however, although an IP format is used, the PPNBE 101 and the private packet network backbone 318 may be separate from (and in some embodiments, firewalled from) the public Internet. IP packets may be routed across the privately managed nodes in the private packet network backbone 318 to the PPNBE gateway corresponding to the carrier of the called party 305a-305g, and the PPNBE gateway may convert packets into a format understood by the corresponding terminating carrier entity (108, 118, 122, 130, 142, 148). As the private packet network backbone 318 is not the public Internet and is privately managed, the number of nodes and routing of packets within the network 318 may be engineered and controlled to maximize call quality and minimize delay. In some embodiments, the private packet network backbone 318 may use other types of protocols other than IP to deliver call traffic within the private packet network backbone 318. For example, the private packet network backbone 318 may use ATM (Asynchronous Transfer Mode) or other packet/cell switching technologies, as desired.

In the private packet network backbone exchange 300, control may be performed by a logical call control entity 320 operatively connected to the private packet network backbone 318. The control entity 320 may include computer-executable instructions stored on a tangible, non-transitory memory of one or more servers, cloud computing devices, data storage devices, or other computing devices, where the computer-executable instructions may be executable by one or more processors. A portion of the one or more devices on which the control entity 320 resides may be directly, locally and/or remotely networked.

Control entity 320 may provide call control as well as feature, service and other types of control needed for communication service, and may communicate with each of the gateways 305a-305g to route calls within and through the PPNBE 101. Using the control entity 320 in connection with a single routing database 321, the private packet network backbone exchange 300 may provide interworking between any two carrier entities (108, 118, 122, 130, 142, 148). Carrier entities (108, 118, 122, 130, 142, 148) may each support a different access technology by which a CPE may access their local network for communication service, e.g., various wireless access technologies, VoIP, cable telephony, POTS, and the like. The PPNBE 300 may provide "one-hop" interworking and integration between any two carrier entities, independent of the subscriber access technology or technologies that each of the two carrier entities employs.

The control entity 320 of the PPNBE 300 may be represented to the PSTN (Public Switched Telephone Network) and/or other networks as a single logical point code or address, or may be identified via information in a single logical routing database, such as the point code or the routing database 321. The single logical routing database 321 may be, for example, an embodiment of the single logical routing database 150 of FIG. 1. The logical routing database 321 may be in communicative connection with the logical call control entity 320, and may physically reside on one or more tangible, non-transitory computer storage media devices, such as a database server, data farm or bank, or computing cloud. A portion of the one or more computer-readable storage media devices may be directly, locally or remotely linked. The one or more computer-readable storage media devices on which the logical routing database 321 resides may or may not be partially or entirely physically co-located with the one or more computing devices on which the logical call control entity 320 is supported. Although the call control entity 320 may not be physically co-located with the logical routing database 321, information in the logical routing database 321 may nonetheless be accessible for use by the control entity 320 in establishing and routing calls.

For some calls, call control signals may be received from external exchanges (108, 118, 122, 130, 142, 148) over out-of-band signaling paths at the call control entity 320. As such, the call control entity 320 may include a connection to a signaling network and may receive and transmit out-of-band call control signals via the signaling network from and to at least some of the exchanges (108, 118, 122, 130, 142, 148). In some embodiments, the signaling network may be an SS7 signaling network, but other out-of-band signaling networks may also be used in accordance with embodiments of the disclosure. In some embodiments, the signaling network may be a data network such as the Internet or other data network.

For some calls, call control signals may be received from external exchanges (108, 118, 122, 130, 142, 148) over in-band communication paths at a PPNBE gateway 305a-305g. In-band control signals may be delivered between the control entity 320 and the receiving gateway 305a-305g via the private packet network backbone 318. For some calls, control signals may be received at a PPNBE gateway over a VoIP-type connection using SIP (Session Initiation Protocol), such as at the PPNBE gateway F 305f from the VoIP gateway 130. For these calls, the control signals may be delivered to the control entity 320 and responses sent back to the gateway F 305f via the private packet network backbone 318 with minimal conversion, if any.

The call control entity 320 may include or may be communicatively coupled to a variable call termination location entity 350, which may be an embodiment of the variable call termination location entity 102 of FIG. 1. The variable call termination location entity 350 may include a set of computer-executable instructions that are executable by one or more processors for providing determining a current location to which a call is to be terminated.

An example of a call scenario is provided in FIG. 2 to illustrate at least a portion of the principles and aspects disclosed herein. In this call scenario, the provider of the PPNBE 300 has an agreement with wireless communications service provider Carrier F to allow the PPNBE 300 direct access to one or more data sources within Carrier F's network 302.

Initially, calling party 352 originates a call to called party 358. The calling party 352 is a subscriber of a wireless communications provider Carrier B, and the called party 358 is a subscriber of a different wireless communications provider Carrier F. The originating call is received at a Mobile Telephone Switching Office (MTSO) 118 of Carrier B, which is in connection with gateway B 305b of the PPNBE 300. The MTSO of Carrier B 118 sends initial call control signaling for the incoming call to the call control entity 320 of the PPNBE 300, denoted in FIG. 2 by the dotted line 355a. In an embodiment, the signaling connection 355a is made over a signaling network, such as an SS7 signaling network.

Upon reception of the initial call control message at the call control entity 320, the control entity 320 determines that the originating call is destined for a subscriber of a wireless service provider Carrier F, e.g., called party 358. For example, the control entity 320 may examine contents of the initial call signaling from the MTSO 118 (e.g., an identification of the called party, an indication of the carrier or service provider of the called party, an indication of a destination, or other contents) to determine that the called party 358 is a subscriber of Carrier F. As such, the call control entity 320 determines that the called party 358 is a mobile subscriber of Carrier F, and the call control entity 320 directs the variable call termination location entity 350 to determine a current location of the called party 358.

The variable call termination location entity 350 directly queries 360a a location data source 362 of Carrier F to obtain a current location 360b of the called party 358. The location data source 362 is administered by Carrier F and typically is in connection with one or more exchanges in the network of Carrier F. The location data source 362, however, is not administered by the provider of the PPNBE 300. Carrier F's network 302 may include one or more location data sources 362, each including location data corresponding to one or more switches or exchanges included in Carrier F's network 302.

The query 360a to the data source 362 and the response 360b from the data source 362 may be, for example, a message exchange, a database read or access, or some other suitable exchange of information between the variable call termination location entity 350 and the data source 362. Typically, the query 360a and response 360b are compatible with a protocol, language or standard that is understood by the data source 362. For example, if the data source 362 is an HLR/VLR, the query 360a may be IS-41-compatible or GSM MAP-compatible.

Additionally, the query 360a is a direct query, i.e., the query 360a is communicated to the data source 362 without any additional processing of contents of the query 360a by any intermediate nodes. For example, although the query 360a may need to be routed through a portion of a network (e.g., a signaling network, the Internet, or some other network) to reach the data source 362, any intermediate nodes along the route merely forward the query 360a and do not process, translate, convert, or operate on any of the contents or payload of the query 360a, except as needed for forwarding purposes. In particular, a Service Control Point (SCP), Intelligent Network node, or other entity or exchange is not needed to process the query 360a.

In this scenario, the variable call termination location entity 350 receives an indication 360b that the mobile device of the called party 358 is not currently being serviced by its home switch 362, but instead is currently being serviced by another switch 368 within Carrier F's network 302, e.g., a "traveling" switch for the mobile device. Based on the response 360b, the call control entity 320 determines an appropriate terminating PPNBE gateway via which the call may be routed from the PPNBE 300 to the traveling switch 368, e.g., gateway F 305f. The terminating PPNBE gateway 350f may be determined by using the routing database 321 of the PPNBE 300, in an embodiment.

Call control entity 320 directs the originating PPNBE gateway B 305b (reference 355b) and the terminating PPNBE gateway F 305f (reference 355c) to set up respective call content or payload delivery paths 370a, 370b with respective external exchanges 118, 368. Additionally, call control entity 320 directs the originating PPNBE gateway B 305b (reference 355b) and the terminating PPNBE gateway F 305f (reference 355c) to set up a logical call content or payload delivery path 370c through the private packet network backbone 318 between the gateway 305b and the gateway 305f. Call control entity 320 also transmits call control signaling corresponding to the terminating part of the call 355d to the traveling switch 368, e.g., by using the signaling network.

At this point in the scenario, complete call signaling paths from the originating MTSO 118 to the PPNBE 300 (355a) and from the PPNBE 300 to the terminating traveling switch 368 (355d) have been established. Complete call content or payload paths 370a-370c between the originating MTSO 118 and the terminating traveling switch 368 through the private packet network backbone 318 are also established.

Note that in this example scenario, the call control entity 320 of the PPNBE 300 does not communicate with the home switch 365 of the called party 358 to determine the current location of the called party 358. For that matter, the call control entity 320 does not communicate with any other external entity (e.g., switch, SCP, Intelligent Network node, etc.) other than the data source 362 of Carrier F to determine the current location of the called party 358. That is, the variable call termination location entity 350 directly accesses 360a the location data source 362 to determine the current location of the called party 358. As such, savings over currently known techniques for determining a variable call termination location are realized. For example, the number of messages and the amount of time to set up a call is decreased, as the PPNBE 300 does not need to rely on Carrier F's home switch 365 or some other entity to query the data source 362. Additionally, connection charges for resource usage between the PPNBE 300 and the home switch 365 are eliminated.

The techniques illustrated by the example scenario are easily adapted to apply to other call termination scenarios where the called party's location varies over time. For example, a call to a variable terminating location need not be originated by a mobile subscriber, but may be originated by a CPE of any known access technology (e.g., a VoIP subscriber, a land-line subscriber, etc.). Furthermore, the called party need not be a mobile subscriber, but may be any communications subscriber whose location at which he or she desires to receive calls is variable over time. For example, a subscriber may activate a "follow-me" feature offered by a VoIP, PBX, land-line or other service provider, so that the subscriber is able to direct calls to be terminated to various different devices or locations on demand or at different times of the day or night. Thus, the techniques discussed herein may easily apply to subscribers of various other communication service providers, as well as to subscribers of communications features where call termination locations may change over time.

For example, the response 360b from the location data source 362 may indicate that the called party 358 (e.g., a subscriber of Carrier F) is roaming in another carrier's network (e.g., a Carrier Z, not shown). Based on this information, the call control entity 320 may direct the call to terminate at the roaming switch in Carrier Z's network that is currently servicing the mobile device 358. In an embodiment, the call control entity 320 may establish a call termination leg with the called party's home switch 365 in Carrier F's network 302, and the home switch 365 may then establish another connection with the roaming switch of Carrier Z. In another embodiment, when the provider of the PPNBE 300 has a relationship with Carrier Z, the call control entity 320 may direct the call to a PPNBE gateway that is connected to the roaming switch of Carrier Z.

In another example, the response 360b from the location data source 362 may indicate that the mobile subscriber 358 has indicated that he or she desires calls to be received at a land-line phone number serviced by LEC 105b. As such, the call control entity 320 may establish a call termination leg between the originating gateway B 305b and the gateway D 305d in connection with the local carrier exchange 122.

In yet another example, a call may be successfully established with the terminating exchange 368, but the called party 358 may not answer, is unavailable, or has indicated a secondary call treatment. In this scenario, the terminating side of the call may be re-directed by the call control entity 320. For example, if the called party 358 does not answer, the traveling switch 368 may signal 355d the call control entity 320 that secondary treatment is desired, e.g., the call is to be routed to voiced mail. Based on the type of secondary treatment, the call control entity 320 may establish an updated termination leg of the call. For example, the call control entity 320 may signal the home switch 365 to set up an updated termination leg for the call to reach a designated voice-mail server or exchange, or the call control entity 320 may direct the call to a PPNBE gateway that is connected to the voice-mail server or exchange.

Although FIG. 2 illustrates an embodiment where the variable call termination location entity 350 directly accesses one particular data source 362 in one particular carrier's network 302, in other embodiments, the variable call termination location entity 350 may access more than one data source in a carrier's network. For example, the variable call termination location entity 350 may directly access a first data source of a particular carrier to determine if a called party subscribes to a feature that allows variable termination location (e.g., a "follow-me" feature or some other feature), and if the called party does subscribe to such a feature, the variable call termination location entity 350 may directly access a second data source of the particular carrier to determine a current location at which the called party desires to receive calls. In another example, the variable call termination location entity 350 may be configured to directly access multiple location data sources of the particular carrier's system, e.g., for multiple calls to multiple CPEs.

In some embodiments, the variable call termination location entity 350 may have direct access to data sources of more than one carrier. For example, the variable call termination location entity 350 may have direct access to one or more HLR/VLRs of a wireless service provider or carrier, and the variable call termination location entity 350 may have direct access to one or more ENUM data sources of a VoIP service provider or carrier. In some embodiments, the variable call termination location entity 350 may have direct access to a location data source that is jointly owned, operated or administered by more than one carrier or service provider. In some embodiments, the variable call termination location entity 350 may have direct access to one or more location data sources that are owned, operated or administered by a provider that is not a communications service provider to subscribers or end-customers, but that provides data storage services to communications service providers that service subscribers or end-customers.

In scenarios where the variable call termination location entity 350 may have direct access to a plurality of data sources of a same carrier and/or of different carriers, each of the plurality of data sources may be coupled to the PPNBE 300 or to the call control entity 320 of the PPNBE 300 via a respective communications link. The variable call termination location entity 350 may select a communications link corresponding to the appropriate data source over which to deliver the query. For example, the communications link may be selected based on the identification of the destination carrier or provider, based on the called party identification, or based on other suitable information indicated by the incoming call.

Figure 3:
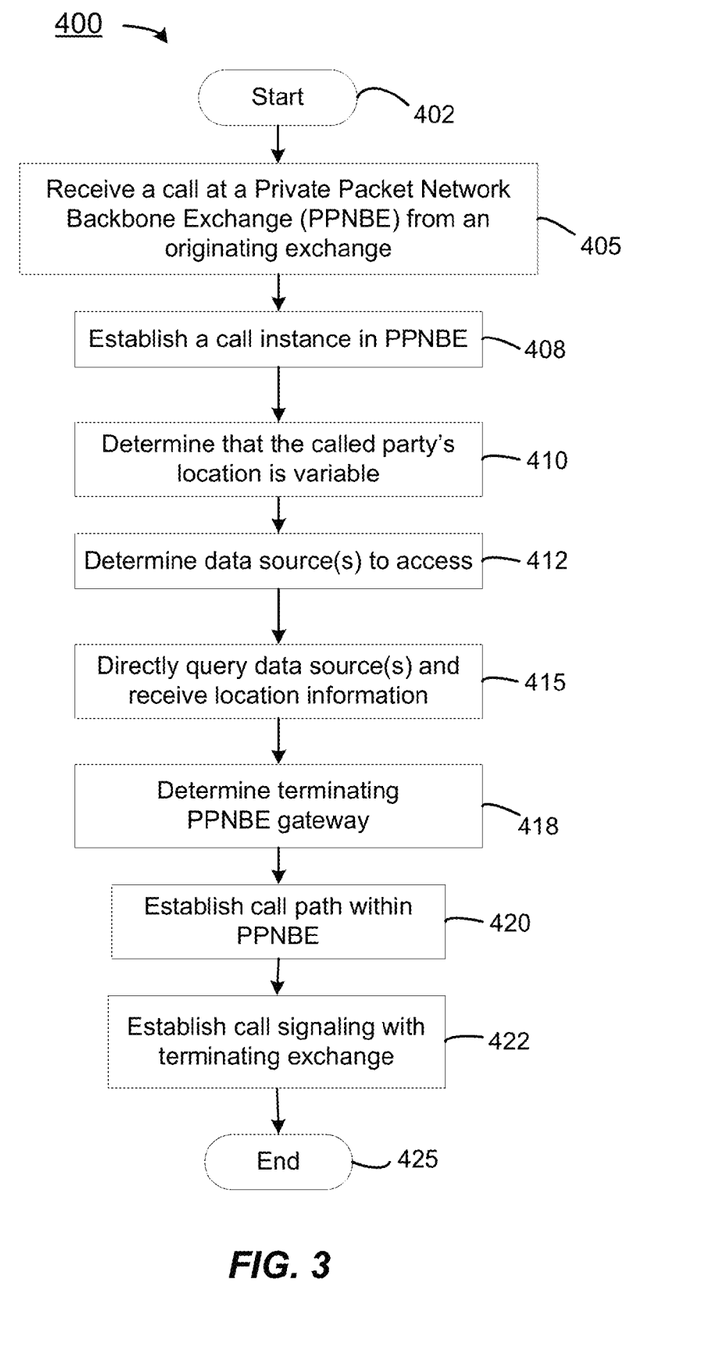
FIG. 3 illustrates an embodiment of a method for providing communication service to variable call termination locations using a private packet network backbone exchange.

FIG. 3 illustrates an embodiment of a method 400 for providing communication service to variable call termination locations using a private packet network backbone exchange (PPNBE). The method 400 may operate in conjunction with embodiments of the communications architecture of FIG. 1 or with other suitable systems. The method 400 may operate in conjunction with embodiments of the private packet network backbone exchange of FIG. 2 or with other suitable exchanges. For clarity of discussion, FIG. 3 is described with references to elements of FIGS. 1 and 2.

At the start (block 402), a call origination may be received at an exchange (block 405). In an embodiment, a call origination may be received at a private packet network backbone exchange (PPNBE) 300 from an originating exchange. The call may be received via any known communication protocol, e.g., in-band, out-of-band, SS7, VoIP, TDM (Time Division Multiplexed), SIP (Session Initiation Protocol), or other communications protocols. In an embodiment, a call control signal corresponding to the originating call may be received at a call control entity 320 of the PPNBE 300 via an out-of-band signaling network. In an embodiment, a call control signal corresponding to the originating call may be received via in-band or other signaling at an originating PPNBE gateway 305a-305g, and the signaling may be forwarded to the call control entity 320. The originating call may be a voice call, a data call, or a combination of voice and data.

The originating exchange may be owned, operated, and/or controlled by a service provider or carrier entity other than the provider of the PPNBE 300. For example, the originating exchange may be a Local Exchange Carrier (LEC) exchange 122, a cellular or wireless switch 118, a gateway of a local carrier system such as a VoIP gateway 130 or cable telephony gateway 142, a tandem exchange 108, a PBX, or any other communications exchange or entity such as discussed with respect to FIG. 1. The local access technology via which a subscriber connects his or her Customer Premises Equipment with the originating exchange may be, for example, a physical connection, a wireless connection of any frequency band, a cable telephony connection, a VoIP connection, a WiFi, WiMAX, or POTS (Plain Old Telephone Service) connection, or a connection of any other known access technology.

At block 408, a call instance corresponding to the received originating call may be established. The call instance may be established, for example, by a logical call control entity 320 of the PPNBE 300. The logical call control entity 320, in conjunction with a logical routing database 321 of the PPNBE 300, may create a call record or instance corresponding to the originating call, may determine any necessary information associated with the originating call (such as billing, call features, and other necessary call information), coordinate the routing of the originating call content through the PPNBE 300, and record events associated with the originating call.

In particular, the call control entity 320 may determine that the location of a termination of the originating call may be variable or may change over time (block 410). The call control entity 320 may determine that the location of a termination of the originating call may be variable based on contents of the signaling received from the originating exchange such as an identification of the carrier servicing the called party, an identification of an identified destination (e.g., destination point code, address or similar), and/or other information included in the received call origination.

The call control entity 320 may use the contents of signaling received from the originating exchange to determine one or more data sources 362 to access for determining a location to which the originating call is to be delivered (block 412). The call control entity 320 may determine the one or more data sources 362 based on an identity of the communications carrier or provider to which the called party subscribes, in an embodiment. For example, if the signaling indicates that the called party 358 is a wireless service provider subscriber (e.g., the originating call is destined for a network of the wireless service provider), the call control entity 320 may determine an appropriate HLR/VLR of the wireless service provider to access to obtain current location information. In another example, if the signaling indicates that the called party is a VoIP service provider (e.g., the originating call is destined for a network of the VoIP service provider), the call control entity may determine an appropriate ENUM data source to access to obtain current location information. In some scenarios, the call control entity 320 may determine multiple data sources to access. For example, the call control entity may determine a first data source to access to determine if the called party subscribes to a feature that may cause variable termination location, and then the call control entity may determine a second data source to access for obtaining the current location to which the call is to be terminated.

At block 415, the call control entity 320 may directly query, message, access, or otherwise exchange information with the one or more data sources 362 determined at block 412. The query and corresponding response may be compatible with a protocol, language or standard that is understood by the one or more data sources. For example, if the data source is an HLR/VLR, an IS-41-compatible query or a GSM MAP-compatible query may be transmitted over a communications link to the one or more data sources. The response to the query may include an indication of the current location to which the call is to be terminated.

Furthermore, as the call control 320 directly queries the one or more data sources 362, the query is directly communicated to the one or more data sources 362 without any additional processing of contents or payload of the query by any intermediate nodes. For example, the call control entity 320 may perform a database read or dip of the one or more data sources 362 by using a database access primitive or function. In another example, the call control 320 may need to send the query through a portion of a network (e.g., a signaling network, the Internet, or some other network) to reach the one or more data sources, such as when the query and response are parts of a message exchange. However, any intermediate nodes along the route merely forward the query and do not process, translate, convert or operate on any of the contents or payload of the query other than that needed for forwarding purposes. In particular, a Service Control Point (SCP), Intelligent Network node, or other entity or exchange does not process, translate or convert any portion of the query. In a similar manner, at block 415, the response is directly received from the data source 362 at the call control entity 320 without additional processing, translating or converting of its contents by any intermediate nodes.

At block 418, a terminating PPNBE gateway via which the originating call is to be delivered from the PPNBE 300 to a terminating exchange may be determined. For example, based on the current location, the call control entity 320 may determine, in conjunction with a single logical routing database 321 of the PPNBE 300, a terminating PPNBE gateway corresponding to the terminating exchange. The terminating exchange may be owned, operated, or controlled by a carrier or service provider other than the provider of the PPNBE 300.

The terminating exchange may be for example, a local exchange 122, a cellular or wireless switch 118, a gateway of a local carrier system such as gateways (130, 142, 148) of cable telephony, wired, or wireless VoIP systems, WiMAX, WiFi, a tandem exchange, a PBX, or the like. The terminating exchange may use a local access technology with which its respective subscribers may connect to the terminating exchange's network, such as, for example, a physical connection, a wireless connection of any frequency band, a cable telephony, VoIP, or POTS connection, or a connection of any other known access technology. The local access technology used by the terminating exchange may be the same or different as the local access technology used by the originating exchange. The carrier or service provider of the terminating exchange may be different from the carrier or service provider of the originating exchange.

At block 420, a call path between the originating exchange and the terminating exchange for delivery of a content or payload of the call may be provided via the PPNBE 300. For example, a logical call path through the private packet network backbone 318 of the PPNBE 300 between the originating PPNBE gateway and the terminating PPNBE gateway may be provided, e.g., by using the packet protocol of the private packet network backbone 318. As such, a "one-hop" call path is provided between the originating and the terminating exchange. That is, the originating call is delivered from the originating exchange to the terminating exchange via the PPNBE 300 without traversing any other exchanges. The originating PPNBE gateway may convert content or payload of the originating call into a format or protocol used internal to the private packet network backbone exchange 300. In some embodiments, the originating PPNBE gateway may convert the call into a public or private IP protocol format. The terminating PPNBE gateway may convert the call content or payload from the format or protocol used internal to the private packet network backbone exchange 300 into a format understood by the terminating exchange.

At block 422, signaling corresponding to the call may be exchanged between the PPNBE 300 and the terminating exchange to establish the termination leg of the call. For example, the call control entity 320 may cause a call origination signal corresponding to the call to be transmitted to the terminating exchange, such as via a signaling network, in-band signaling, or other suitable signaling.

At block 425, the method 400 may end.

Figure 4:
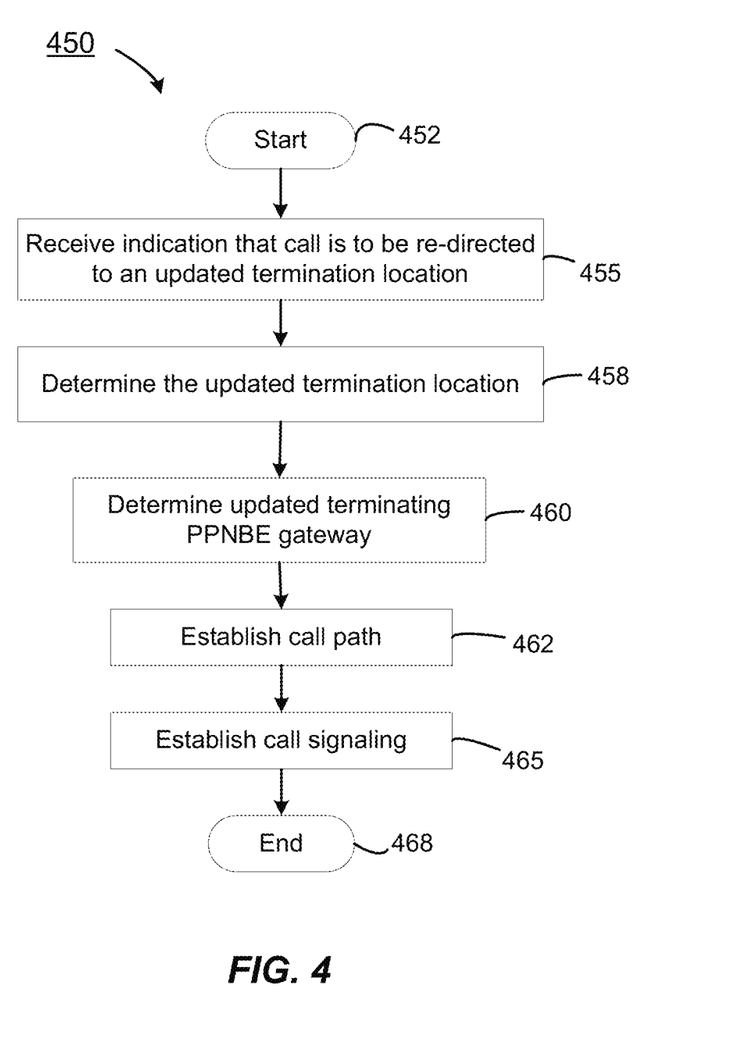
FIG. 4 illustrates an embodiment of a method for re-directing a call termination using a private packet network backbone exchange.

FIG. 4 illustrates an embodiment of a method 450 for re-directing a call termination using a private packet network backbone exchange (PPNBE). The method 450 may operate in conjunction with embodiments of the communications architecture of FIG. 1 or with other suitable systems. The method 400 may operate in conjunction with embodiments of the private packet network backbone exchange described in FIG. 2 or with other suitable exchanges, and the method 450 may operate in conjunction with the method 400 of FIG. 3 or with other suitable methods. In an embodiment, the method 452 may be executed after a call with variable termination location has been set up or established using a private packet network backbone exchange, e.g., after the block 422 of the method 400. For clarity of discussion, FIG. 4 is described with references to elements of FIGS. 1, 2 and 3.

At the start (block 452), a private packet network backbone exchange (PPNBE) 300 may receive signaling indicating that an established call is to be re-directed (block 455). The call may be re-directed for various reasons, e.g., the called party did not answer the call and the call should be forwarded or directed to voice mail, the called party has physically moved to another location, the initial terminating exchange is not able to process the call, the called party has indicated (perhaps during the call itself) that the call is to be re-directed to another CPE or another location, etc. The re-direction signaling may include an indication of an updated call termination location, for example, an indication of the home switch of the called party, of another switch in the terminating carrier's network, of an entity within the terminating carrier's network (e.g., a server or exchange that provides voice mail, announcements, or other secondary call treatment), of a network of another carrier altogether (which may be different from the carrier from which the call was originated and may be different from the carrier at which the call was originally terminated), or of another CPE or another location as indicated by the called party.

In an embodiment, the initial terminating exchange may send signaling to the logical call control entity 320 of the PPNBE 300 indicating the call is to be re-directed. The re-direction signaling may be received by the logical call control entity 320 via out-of-band signaling, in-band signaling, or other suitable signaling. Generally, the signaling vehicle for indicating call re-direction is the same as that used for initial call setup between the initial terminating exchange and the PPNBE 300.

At block 458, an updated call termination location and/or a corresponding terminating exchange may be determined. For example, the logical call control entity 320 may determine the updated call termination location and/or the updated terminating exchange. In some scenarios, the updated call termination location and/or its updated terminating exchange may be directly obtained from contents of the re-direction signaling, e.g., a destination point code. In some scenarios, the updated call termination location and/or its corresponding updated terminating exchange may be inferred from the contents of the re-direction signaling. For example, if the re-direction signaling indicates that the call is to be re-directed to voice mail, the PPNBE 300 may infer the terminating exchange to be the voice mail server or exchange of the terminating carrier. In some cases, an inference of the terminating exchange may be performed by accessing a data source such as the single logical routing database 321 of the PPNBE 300, or by accessing a data source administered by the terminating or different communications carrier, e.g., the data source 362 or another data source.

At block 460, an updated terminating PPNBE gateway corresponding to the updated call termination location and/or the corresponding updated terminating exchange may be determined. For example, the logical call control entity 320 may determine the updated terminating PPNBE gateway based on the logical routing database 321, where the updated terminating PPNBE gateway is connected to the updated terminating exchange.

At block 462, a logical call path for delivery of the content or payload of the call between the originating exchange and the updated terminating exchange may be established using the PPNBE 300, in a manner similar to that previously discussed for the originating exchange and the initial terminating exchange. In an embodiment, the logical call path through the private packet network backbone 318 between the originating PPNBE gateway and the initial terminating PPNBE gateway may be maintained, and an additional segment of the logical call path may be established between the initial terminating PPNBE gateway and the updated PPNBE terminating gateway via the private packet network backbone 318. In an embodiment, a new logical call path between the originating PPNBE gateway and the updated terminating PPNBE gateway may first be established via the private packet network backbone 318, and then, after the new logical call path has been established, the initial logical call path between the originating PPNBE gateway and the initial terminating PPNBE gateway may be torn down.

At block 465, signaling to establish the call may be exchanged between the PPNBE 300 and the updated terminating exchange. For example, the call control entity 320 may cause a call origination signal corresponding to the call to be transmitted to the updated terminating exchange, such as via a signaling network, in-band signaling, or other suitable signaling.

At block 468, the method 400 may end.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. Accordingly, it should be understood that the methods and apparatus described herein are illustrative only and are not limiting upon the scope of the claims.

Thus, many modifications and variations may be made in the techniques and structures described and illustrated herein without departing from the spirit and scope of the present claims.

What is claimed is:

1. A private packet network backbone exchange (PPNBE) having variable call termination location capability, comprising:
   a logical call control entity coupled to a single logical routing database;
   a plurality of call content delivery connections to a plurality of exchanges;
   a signaling connection to a signaling network, the signaling connection being coupled to the logical call control entity and the signaling network being communicatively coupled to at least one exchange of the plurality of exchanges;
   a private packet network; and
   a communication link to a location data source administered by a provider other than a provider of the PPNBE, wherein:
      the logical call control entity is configured to:
         receive an incoming call from a first exchange of the plurality of exchanges via a first call content delivery connection, wherein the incoming call indicates a called party, wherein signaling from the first exchange indicates that a call termination location at which the called party receives calls varies over time, and wherein the first exchange is an originating exchange corresponding to the incoming call;
         cause to be transmitted, via the communication link, a direct query of the location data source to determine a single current location corresponding to a second exchange of the plurality of exchanges, the second exchange capable of terminating the incoming call to the called party at the single current location, and
         establish, in conjunction with the single logical routing database, a one-hop communication session to deliver, over the private packet network, a content of the incoming call between the first call content delivery connection to the first exchange and a second call content delivery connection to the second exchange of the plurality of exchanges without traversing any other of the plurality of exchanges, the second exchange delivering the content of the incoming call to the called party at the single current location.

2. The PPNBE of claim 1, wherein the first exchange and the second exchange are controlled by different communication carriers.

3. The PPNBE of claim 1, wherein a first local access technology by which a first customer-premise equipment (CPE) originates the incoming call and a second local access technology by which a second CPE to which the incoming call is to be terminated are different local access technologies.

4. The PPNBE of claim 1, wherein the signaling network is an SS7 network.

5. The PPNBE of claim 1, wherein the private packet network uses an Internet Protocol, an Asynchronous Transfer Mode (ATM) protocol, or other packet protocol.

6. The PPNBE of claim 1, wherein a payload of the direct query is processed by the location data source and the payload of the direct query is not processed by any intermediate computing device between the PPNBE and the location data source.

7. The PPNBE of claim 1, wherein the direct query of the location data source is compatible with one of: a Telecommunications Industry Association Interim Standard 41 (IS-41) standard, a GSM Mobile Application Part (MAP) standard, or an E.164 Number Mapping (ENUM) standard.

8. The PPNBE of claim 1, wherein the location data source includes at least one of a Home Location Register/Visiting Location Register (HLR/VLR) data source or an E.164 Number Mapping (ENUM) data source.

9. The PPNBE of claim 1, wherein the communication link is a particular communication link included in a plurality of communication links to a plurality of location data sources, and wherein the logical call control entity is further configured to select the particular communication link.

10. A method for providing communication service to variable call termination locations, comprising:
receiving, from a first exchange at a logical call control entity of a private packet network backbone exchange (PPNBE), a first call control signal corresponding to an incoming call to a called party, wherein at least a portion of contents of the first call control signal indicates that a call termination location of the incoming call varies over time, and wherein the first exchange is an originating exchange corresponding to the incoming call;
directly querying, by the logical call control entity via a communication link, a location data source to determine a single current location of the called party, the location data source administered by a provider other than a provider of the PPNBE;
determining, by the logical call control entity in conjunction with a single logical routing database of the PPNBE, and based on the single current location of the called party, a second exchange corresponding to the single current location to which the incoming call is to be delivered, wherein the second exchange is capable of terminating the incoming call to the called party at the single current location;
providing, via a private packet network included in the PPNBE, a call path for delivery of a content of the incoming call between the first exchange and the second exchange without traversing any other exchanges, wherein the first exchange and the second exchange are each controlled by different communication carriers; and
causing a second call control signal corresponding to the incoming call to be transmitted from the logical call control entity of the PPNBE to the second exchange.

11. The method of claim 10, wherein causing the second call control signal corresponding to the incoming call to be transmitted from the logical call control entity of the PPNBE to the second exchange comprises causing the second call control signal corresponding to the incoming call to be transmitted from the logical call control entity of the PPNBE to the second exchange using a signaling network coupled to the PPNBE.

12. The method of claim 10, wherein the communication link is a particular communication link included in a plurality of communication links to a plurality of location data sources, and wherein the method further comprises selecting the particular communication link based on a called party indicated by the incoming call.

13. The method of claim 10, wherein directly querying the location data source via the communication link comprises:
generating, by the logical call control entity, a query that is compatible with one of a Telecommunications Industry Association Interim Standard 41 (IS-41) standard, a GSM Mobile Application Part (MAP) standard, or an E.164 Number Mapping (ENUM) standard; and
causing the query to be transmitted from the PPNBE to the location data source using the communication link and without a payload of the query being processed by any intermediate computing device.

14. The method of claim 10, wherein directly querying the location data source comprises directly querying a Home Location Register/Visiting Location Register (HLR/VLR).

15. The method of claim 10, wherein directly querying the location data source comprises directly querying an E.164 Number Mapping (ENUM) data source.

16. The method of claim 10, wherein providing the call path for delivery of the content of the incoming call via the private packet network comprises providing the call path for delivery of the content of the incoming call using an Internet Protocol or another packet or cell switching technology supported by the private packet network.

17. The method of claim 10, wherein the call path for the delivery of the content of the incoming call is a first call path, and the method further comprises:
receiving, at the logical call control entity, an indication to re-direct the incoming call to terminate at another location different from the current location;
causing to be transmitted, by the logical call control entity via a signaling network coupled to the PPNBE to a particular exchange corresponding to another location, control signaling corresponding to the incoming call; and
providing, via the private packet network of the PPNBE, a second call path for the delivery of the content of the incoming call to the particular exchange corresponding to the another location.

18. The method of claim 17, wherein the another location corresponds to:
a home exchange corresponding to the called party;
a particular call termination location or a particular Customer Premise Equipment (CPE) indicated by the called party; or
an exchange to provide secondary call treatment of the incoming call.

19. A call control entity for providing communication service to variable call termination locations, comprising:
   a first connection to a signaling network;
   a second connection to a private packet network;
   a third connection to a location data source administered by a provider other than a provider of the call control entity;
   a computing device including a processor and a memory; and
   computer-executable instructions stored on the memory and executable by the processor to:
      receive, from a first exchange coupled to the private packet network, a first call control signal corresponding to an incoming call to a called party, wherein the first call control signal indicates that a call termination location of the incoming call varies over time, and wherein the first exchange is an originating exchange corresponding to the incoming call;
      generate a query to directly access, using the third connection, the location data source to determine a single current location of the called party, wherein a payload of the query is not processed by any intermediate computing device between the call control entity and one or more computing devices on which the location data source is stored;
      determine, based on the single current location of the called party, a second exchange corresponding to the single current location, coupled to the private packet network and to which the incoming call is to be delivered, wherein the second exchange is capable of terminating the incoming call to the called party at the single current location;
      provide, via the second connection, an indication of a logical call path through the private packet network for delivery of a content of the incoming call between the first exchange and the second exchange; and
      cause a second call control signal corresponding to the incoming call to be transmitted via the first connection from the call control entity to the second exchange.

20. The call control entity of claim 19, wherein the first connection, the second connection, the third connection, the private packet network and the call control entity are included in a private packet network backbone (PPNBE), and wherein the signaling network, the location data source, the first exchange and the second exchange are each coupled to the PPNBE.

21. The call control entity of claim 19, wherein the provider of the call control entity, a provider of the first exchange, and a provider of the second exchange are different communication service providers.

22. The call control entity of claim 19, wherein the signaling network is the public Internet.

23. The call control entity of claim 19, wherein the signaling network is an SS7 (Signaling System 7) network.

24. The call control entity of claim 19, wherein the location data source is a particular location data source included in a plurality of location data sources, and wherein the third connection is a particular communication link included in a plurality of communication links to the plurality of location data sources.

25. The call control entity of claim 19, wherein the query is compatible with one of: a Telecommunications Industry Association Interim Standard 41 (IS-41) standard, a GSM Mobile Application Part (MAP) standard, or an E.164 Number Mapping (ENUM) standard.

26. The call control entity of claim 19, wherein the location data source is one of a Home Location Register/Visiting Location Register (HLR/VLR) or an E.164 Number Mapping (ENUM) data source.

27. The call control entity of claim 19, wherein the logical call path is established within the private packet network using an Internet Protocol (IP), an Asynchronous Transfer Mode (ATM) protocol, or another packet protocol.

28. The call control entity of claim 19, wherein the logical call path is a first logical call path, and wherein the computer-executable instructions stored on the memory are further executable by the processor to:
   receive, via the first connection, an indication to re-direct the incoming call to terminate at another location different from the current location;
   cause a third call control signal corresponding to the incoming call to be transmitted to a particular exchange corresponding to the another location; and
   provide, via the second connection, an indication of a second logical call path through the private packet network for the delivery of the content of the incoming call to the particular exchange corresponding to the another location.

29. The call control entity of claim 28, wherein the another location corresponds to:
   a home exchange corresponding to the called party;
   a particular call termination location or a particular Customer Premise Equipment (CPE) indicated by the called party; or
   an exchange to provide secondary call treatment of the incoming call.

* * * * *